United States Patent
Arinaga et al.

(10) Patent No.: US 10,655,575 B2
(45) Date of Patent: May 19, 2020

(54) INTAKE SYSTEM PIPING STRUCTURE OF INTERNAL COMBUSTION ENGINE

(71) Applicant: NISSAN MOTOR CO., LTD., Yokohama-shi, Kanagawa (JP)

(72) Inventors: Tsuyoshi Arinaga, Kanagawa (JP); Naozumi Kato, Kanagawa (JP)

(73) Assignee: NISSAN MOTOR CO., LTD., Yokohama-shi (JP)

( * ) Notice: Subject to any disclaimer, the term of this patent is extended or adjusted under 35 U.S.C. 154(b) by 0 days.

(21) Appl. No.: 15/552,638

(22) PCT Filed: Feb. 23, 2015

(86) PCT No.: PCT/JP2015/055006
§ 371 (c)(1),
(2) Date: Aug. 22, 2017

(87) PCT Pub. No.: WO2016/135820
PCT Pub. Date: Sep. 1, 2016

(65) Prior Publication Data
US 2018/0017026 A1    Jan. 18, 2018

(51) Int. Cl.
*F02M 35/10* (2006.01)
*F02B 29/04* (2006.01)
(Continued)

(52) U.S. Cl.
CPC ....... *F02M 35/10144* (2013.01); *F02B 29/04* (2013.01); *F02B 29/0406* (2013.01);
(Continued)

(58) Field of Classification Search
CPC ....... F02M 35/10144; F02M 35/10268; F02M 35/112
(Continued)

(56) References Cited

U.S. PATENT DOCUMENTS

| 8,499,748 B2 * | 8/2013 | Braic | F02M 26/12 |
| | | | 123/568.17 |
| 9,488,134 B2 * | 11/2016 | Jun | F02M 26/20 |

(Continued)

FOREIGN PATENT DOCUMENTS

| JP | 1-102434 U | 7/1989 |
| JP | 2007-224786 A | 9/2007 |

(Continued)

*Primary Examiner* — Lindsay M Low
*Assistant Examiner* — Omar Morales
(74) *Attorney, Agent, or Firm* — Foley & Lardner LLP

(57) ABSTRACT

An intake system piping structure of an internal combustion engine includes an intake manifold connected to an end-side first cylinder and an end-side second cylinder which are provided farthest from each other in a cylinder bank in which a plurality of cylinders is placed in line, and an intercooler connected to the intake manifold. The intercooler is arranged in such a manner that a widthwise center of the intercooler on the side of an intake inlet and a widthwise center of the intercooler on the side of the manifold are offset to the side of the end-side second cylinder from a cylinder bank direction center line in center between an axial center line of the end-side first cylinder and an axial center line of the end-side second cylinder. Furthermore, the intercooler is also arranged in such a manner that an offset amount of the widthwise center of the intercooler on the side of the intake inlet from the cylinder bank direction center line is greater than an offset amount of the widthwise center of the intercooler on the side of the manifold from the cylinder bank direction center line.

6 Claims, 4 Drawing Sheets

(51) Int. Cl.
*F02M 35/104* (2006.01)
*F02M 35/112* (2006.01)

(52) U.S. Cl.
CPC ..... *F02B 29/0475* (2013.01); *F02M 35/1045* (2013.01); *F02M 35/10268* (2013.01); *F02M 35/112* (2013.01); *Y02T 10/146* (2013.01)

(58) Field of Classification Search
USPC .................................................. 123/184.38
See application file for complete search history.

(56) References Cited

U.S. PATENT DOCUMENTS

| | | | |
|---|---|---|---|
| 2009/0020106 A1 | 1/2009 | Iijima et al. | |
| 2012/0285426 A1* | 11/2012 | Hayman | F02M 35/10222 123/563 |
| 2012/0298066 A1* | 11/2012 | Leroux | F02B 29/0475 123/193.5 |
| 2014/0311142 A1* | 10/2014 | Speidel | F02B 33/44 60/599 |

FOREIGN PATENT DOCUMENTS

| | | |
|---|---|---|
| JP | 2009-270508 A | 11/2009 |
| JP | 2010-510425 A | 4/2010 |
| JP | 2012-92674 A | 5/2012 |
| JP | 2013-11175 A | 1/2013 |
| WO | WO 2008/061694 A1 | 5/2008 |
| WO | WO-2014/033053 A1 | 3/2014 |

* cited by examiner

INTAKE SYSTEM PIPING STRUCTURE OF INTERNAL COMBUSTION ENGINE

TECHNICAL FIELD

The present invention relates to an intake system piping structure of an internal combustion engine.

BACKGROUND ART

Some vehicle such as an automobile includes an intercooler to cool the intake air whose temperature is increased due to boost by a supercharger. By doing so, intake efficiency for a combustion chamber of an internal combustion engine of the vehicle can be enhanced.

JP2009-270508A discloses an internal combustion engine with an intercooler in which an intake manifold and an intercooler are integrated.

SUMMARY OF INVENTION

In general design, in consideration with an allocation of the intake air, an intercooler is arranged in such a manner that a cylinder bank direction center line of an internal combustion engine substantially matches a widthwise center line of the intercooler. The cylinder bank direction center line of the internal combustion engine indicates a center between axial center lines of two cylinders provided farthest from each other in a cylinder bank.

However, due to a situation of arrangement of an auxiliary machine such as an alternator, there is a case where the intercooler cannot be arranged in such a way. In a case where the intercooler cannot be arranged in such a manner that the cylinder bank direction center line of the internal combustion engine matches the widthwise center line of the intercooler, an allocation of the inflow air becomes remarkably different between the cylinders. Therefore, even in a case where the cylinder bank direction center line of the internal combustion engine cannot match the widthwise center line of the intercooler, it is desirable to make the allocation of the inflow air not remarkably different between the cylinders.

An object of the present invention is to, even in a case where an intercooler cannot be arranged in such a manner that a cylinder bank direction center line of an internal combustion engine substantially matches a widthwise center line of the intercooler, make an allocation of the inflow air not remarkably different between cylinders.

According to one aspect of the present invention, an intake system piping structure of an internal combustion engine includes an intake manifold connected to an end-side first cylinder and an end-side second cylinder which are provided farthest from each other in a cylinder bank in which a plurality of cylinders is placed in line, and an intercooler connected to the intake manifold. Here, in the intake system piping structure of the internal combustion engine, the intercooler is arranged in such a manner that a widthwise center of the intercooler on the side of an intake inlet and a widthwise center of the intercooler on the side of the manifold are offset to the side of the end-side second cylinder from a cylinder bank direction center line in center between an axial center line of the end-side first cylinder and an axial center line of the end-side second cylinder. Furthermore, in the intake system piping structure of the internal combustion engine, the intercooler is also arranged in such a manner that an offset amount of the widthwise center of the intercooler on the side of the intake inlet from the cylinder bank direction center line is greater than an offset amount of the widthwise center of the intercooler on the side of the manifold from the cylinder bank direction center line.

DESCRIPTION OF EMBODIMENTS

Hereinafter, an embodiment of the present invention will be described with reference to the drawings and the like.

Figure 1:
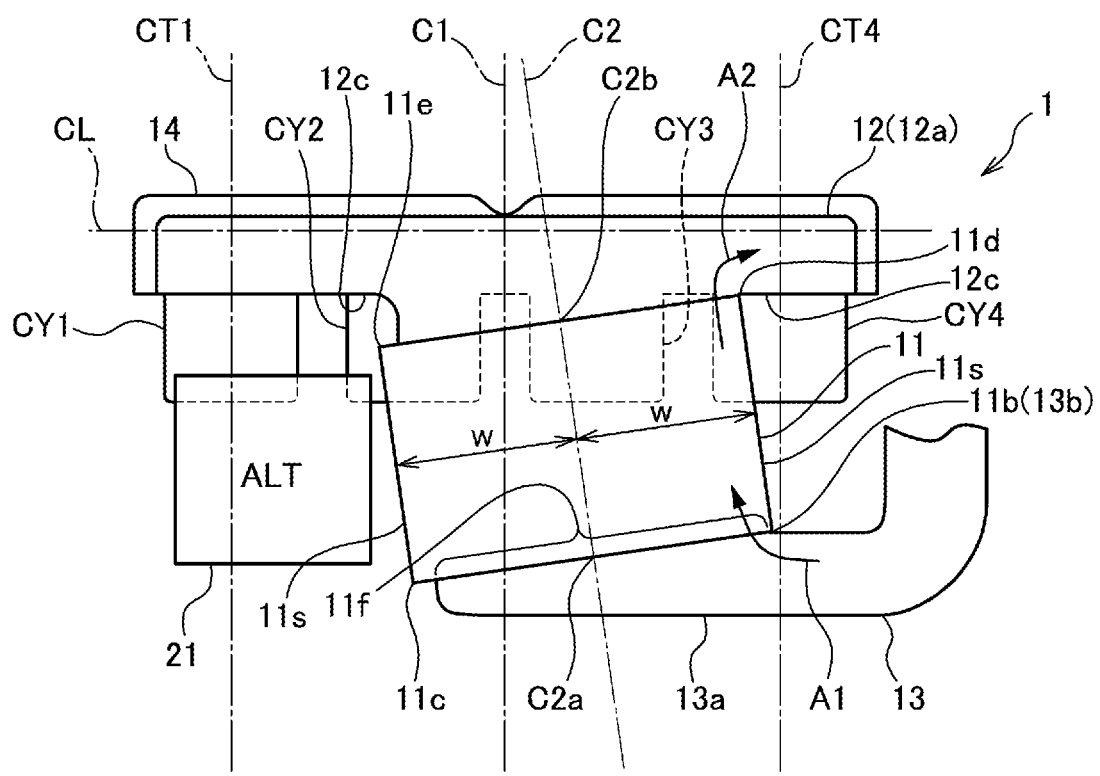
FIG. 1 is a front view of an internal combustion engine with an intercooler in the present embodiment.
Figure 1:
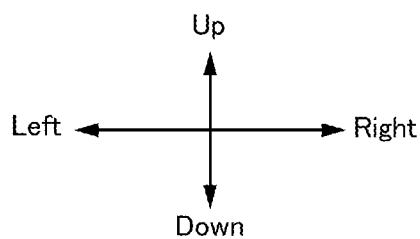
Figure 2:
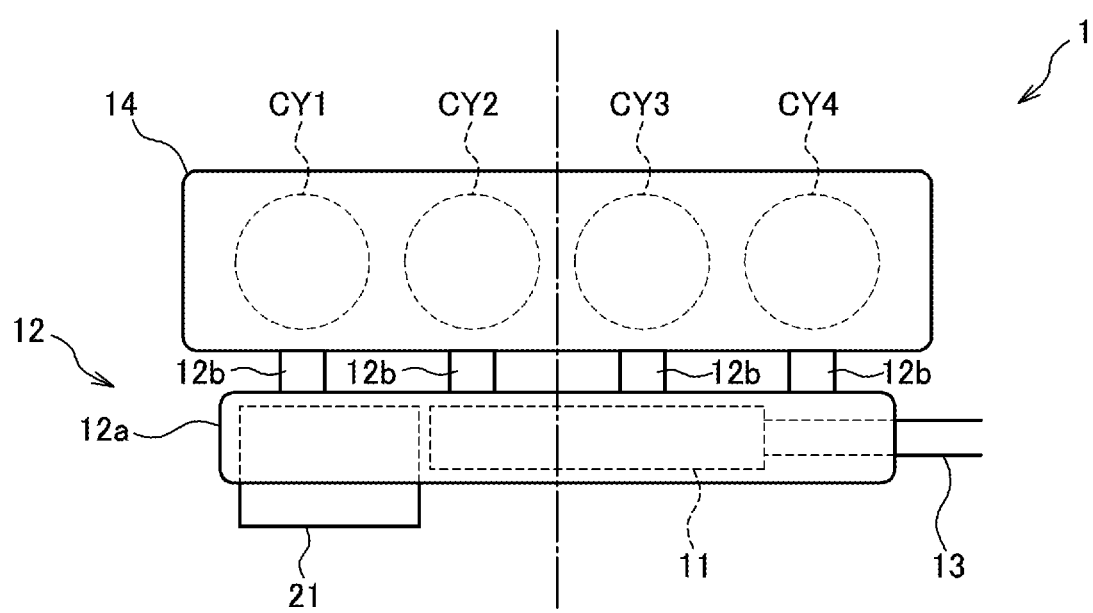
FIG. 2 is a plan view of the internal combustion engine with the intercooler in the present embodiment.
Figure 2:
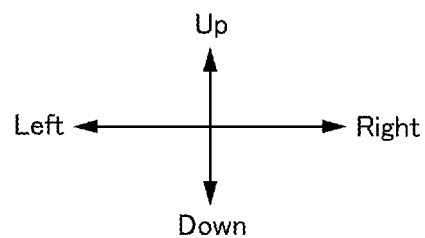

FIG. 1 is a front view of an internal combustion engine with an intercooler in the present embodiment. FIG. 2 is a plan view of the internal combustion engine with the intercooler in the present embodiment. These figures show an intake system piping structure of an internal combustion engine 1 with an intercooler.

The internal combustion engine 1 with the intercooler includes a liquid-cooled intercooler 11 (corresponding to an intercooler), an intake manifold 12, an intake air passage member 13, and a cylinder block 14. The internal combustion engine 1 with the intercooler also includes a first cylinder CY1 (corresponding to an end-side first cylinder), a second cylinder CY2, a third cylinder CY3, and a fourth cylinder CY4 (corresponding to an end-side second cylinder). An auxiliary machine such as an alternator 21 is arranged around the internal combustion engine 1 with the intercooler.

The liquid-cooled intercooler 11 cools the air passing through an interior thereof. The liquid-cooled intercooler increases density of the intake air whose temperature is increased by compression by a supercharger or the like, and enhances intake efficiency for the cylinders. A flow passage in the liquid-cooled intercooler 11 is formed in such a shape that the intake air flows in the direction substantially along side surfaces 11s of the liquid-cooled intercooler 11 in an interior thereof. The liquid-cooled intercooler 11 is connected to an inlet of a manifold portion 12a.

The intake manifold 12 includes the manifold portion 12a and branch portions 12b. Flow passages of the air in the manifold portion 12a and the branch portions 12b are also formed in shapes substantially along outer forms of these flow passages in interiors of these flow passages. The inlet of the manifold portion 12a is connected to an outlet of the liquid-cooled intercooler 11. The four branch portions 12b extend from the manifold portion 12a. The four branch portions 12b are connected to the cylinders CY1 to CY4 in the cylinder block 14.

The intake air passage member 13 lets the intake air compressed by the supercharger (not shown) flow into the liquid-cooled intercooler 11. A flow passage in the intake air passage member 13 is also formed in the direction substantially along an outer form of the intake air passage member 13 in an interior of the intake air passage member 13. The intake air passage member 13 is connected to a bottom portion intake inlet (which is indicate on FIG. 1 as a connection portion 11f) of the liquid-cooled intercooler 11 from the side of the fourth cylinder CY4.

The cylinder block 14 includes four cylinders of the first cylinder CY1, the second cylinder CY2, the third cylinder CY3, and the fourth cylinder CY4. The first cylinder CY1, the second cylinder CY2, the third cylinder CY3, and the fourth cylinder CY4 are placed in line in the cylinder bank direction (in the left and right direction in FIG. 1). The first cylinder CY1 and the fourth cylinder CY4 are provided farthest from each other. The cylinders in the cylinder block 14 are connected to the four branch portions 12b of the intake manifold 12.

FIG. 1 shows a cylinder bank direction center line C1 in center between an axial center line CT1 of the first cylinder CY1 and an axial center line CT4 of the fourth cylinder CY4. FIG. 1 also shows a widthwise center line C2 of the liquid-cooled intercooler 11. The widthwise center line C2 of the liquid-cooled intercooler 11 is a center line between the side walls 11s excluding a projection portion of the liquid-cooled intercooler 11 in the width direction of the liquid-cooled intercooler 11. FIG. 1 shows that a distance between the center line C2 and the left side wall 11s and a distance between the center line C"2 and the right side wall 11s are equally w. FIG. 1 also shows an orthogonal line CL orthogonal to the axial center line CT1 of the first cylinder CY1 and the axial center line CT4 of the fourth cylinder CY4.

In the intake system piping structure of the internal combustion engine 1 in the present embodiment, the liquid-cooled intercooler 11 is arranged in such a manner that a widthwise center C2a of the liquid-cooled intercooler 11 on the side of the intake inlet and a widthwise center C2b of the liquid-cooled intercooler 11 on the side of the intake manifold 12 are offset to the side of the fourth cylinder CY4 from the cylinder bank direction center line C1 in center between the axial center line CT1 of the first cylinder CY1 and the axial center line CT4 of the fourth cylinder CY4.

The liquid-cooled intercooler 11 is also arranged in such a manner that an offset amount of the widthwise center C2a of the liquid-cooled intercooler 11 on the side of the intake inlet from the cylinder bank direction center line C1 is greater than an offset amount of the widthwise center C2b of the liquid-cooled intercooler 11 on the side of the intake manifold 12 from the cylinder bank direction center line C1. By doing so, the liquid-cooled intercooler 11 is arranged to be inclined so that the widthwise center C2a of the liquid-cooled intercooler 11 on the side of the inlet of the liquid-cooled intercooler 11 is placed closer to the side of the fourth cylinder CY4 than the widthwise center C2b of the liquid-cooled intercooler 11 on the side of an outlet of the liquid-cooled intercooler 11.

In relation to the auxiliary machine such as the alternator 21, there is a case where the liquid-cooled intercooler 11 is arranged in such a manner that the widthwise center C2 of the liquid-cooled intercooler 11 does not match the cylinder bank direction center line C1. Even in such a case, in the present embodiment, the liquid-cooled intercooler 11 is provided closer to the fourth cylinder CY4 and the liquid-cooled intercooler 11 is arranged to be inclined so that the widthwise center C2a of the liquid-cooled intercooler 11 on the side of the inlet is placed closer to the fourth cylinder CY4 than the widthwise center C2b on the side of the outlet. Therefore, without providing a sharp curve point in the flow passage of the air flowing into the fourth cylinder CY4, the air can flow into the fourth cylinder CY4 by a route of arrows A1, A2 shown in FIG. 1.

In such a way, the route of the air flowing into the fourth cylinder CY4 can be a route having no sharp curve point. Thus, the air can also flow into the fourth cylinder CY4 by the substantially same amount as the air flowing into the first cylinder CY1. As a result, an inflow amount of the air from the first cylinder CY1 to the fourth cylinder CY4 can be not remarkable different between the cylinders. It should be noted that effects of the present embodiment will be described in more detail in comparison to an internal combustion engine of comparative examples described later.

As described above, the intake air passage member 13 is connected from the side of the fourth cylinder CY4 to the side of the intake inlet of the liquid-cooled intercooler 11. In the present embodiment, the intake air passage member 13 is arranged in such a manner that a bottom portion 13a of the intake air passage member 13 in the direction extending on the lower side of the liquid-cooled intercooler 11 is parallel to the orthogonal line CL.

It should be noted that in the connection portion 11f between the liquid-cooled intercooler 11 and the intake air passage member 13, a sectional area thereof is enlarged as far as possible to enhance intake efficiency.

By doing so, although the liquid-cooled intercooler 11 is arranged to be inclined, the intake air passage member 13 is extended in such a manner that the bottom portion 13a thereof is parallel to the orthogonal line CL, and directly connected to the bottom portion of the liquid-cooled intercooler 11. In other words, the intake air passage member 13 does not stand upward but is directly connected to the bottom portion of the liquid-cooled intercooler 11 while extending in parallel to the orthogonal line CL. Therefore, up-down length of the entire intake system piping structure of the internal combustion engine 1 can be shortened, so that a compact internal combustion engine 1 can be provided.

In the present embodiment, the connection portion 11f between the intake air passage member 13 and the liquid-cooled intercooler 11 is the bottom portion of the liquid-cooled intercooler 11. In the intake air passage member 13, as more distant from the side of the fourth cylinder CY4 and closer to the side of the first cylinder CY1, a distance from the connection portion 11f to the bottom portion 13a of the intake air passage member 13 gradually becomes shorter.

By doing so, the intake air passage member 13 can be directly connected to the bottom portion of the liquid-cooled intercooler 11 to be parallel to the orthogonal line CL. Therefore, although the liquid-cooled intercooler 11 is inclined, the up-down length of the entire intake system piping structure of the internal combustion engine 1 can be shortened, so that a compact internal combustion engine 1 can be provided.

Further, in the internal combustion engine 1 in the present embodiment, the liquid-cooled intercooler 11 and the intake air passage member 13 are connected in such a manner that a lower end 11b of the liquid-cooled intercooler 11 on the side of the fourth cylinder CY4 matches an upper end 13b of a portion of the intake air passage member 13, the portion extending in parallel to the orthogonal line CL. A lower end 11c of the liquid-cooled intercooler 11 on the side of the first cylinder CY1 is arranged on the lower side of an upper end of the intake air passage member 13. Under such an arrangement relationship, the liquid-cooled intercooler 11 and the intake air passage member 13 are connected.

Since the liquid-cooled intercooler 11 and the intake air passage member 13 are connected with the above configuration, without letting stand on the lower side of the liquid-cooled intercooler 11, the intake air passage member 13 can be directly connected to the bottom portion of the liquid-cooled intercooler 11. Therefore, the up-down length of the entire intake system piping structure of the internal combustion engine 1 can be shortened, so that a compact internal combustion engine 1 can be provided.

In the internal combustion engine 1 in the present embodiment, the liquid-cooled intercooler 11 and the intake manifold 12 are connected in such a manner that an upper end 11d of the liquid-cooled intercooler 11 on the side of the fourth cylinder CY4 matches a lower surface 12c of the manifold portion 12a. An upper end 11e of the liquid-cooled intercooler 11 on the side of the first cylinder CY1 is arranged at a position lower than the lower surface 12c of the manifold portion 12a. Under such an arrangement relationship, the liquid-cooled intercooler 11 and the manifold portion 12a are connected.

By doing so, the right upper end 11d of the liquid-cooled intercooler 11 is directly connected to the lower surface 12c of the manifold portion 12a. Thus, the up-down length of the entire intake system piping structure of the internal combustion engine 1 can be shortened, so that a compact internal combustion engine 1 can be provided.

Next, an internal combustion engine 101 with an intercooler of the comparative example will be described, and superiority of the internal combustion engine 1 with the intercooler in the present embodiment will be described in comparison to the internal combustion engine 101 with the intercooler of the comparison example.

Figure 3:
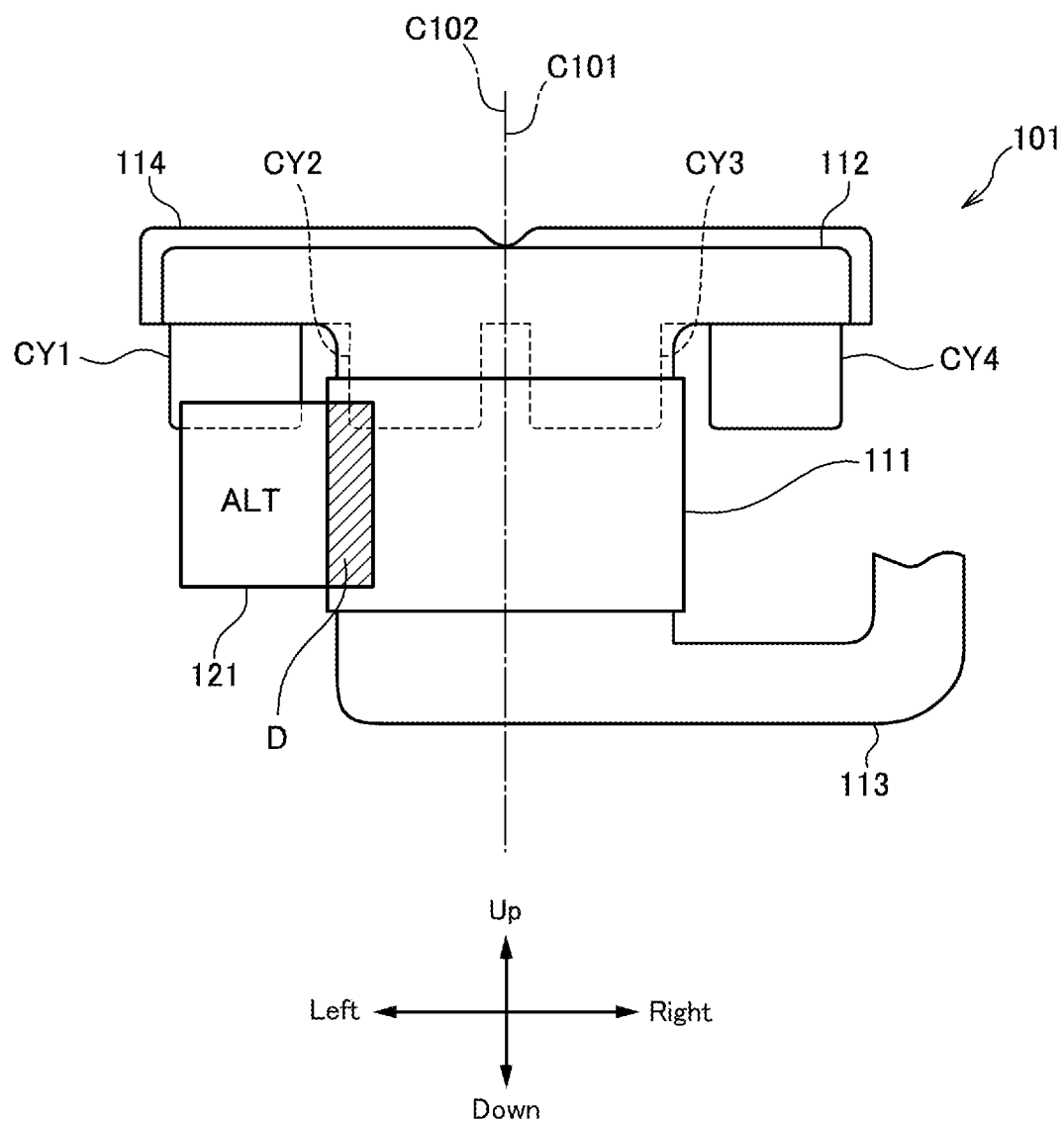
FIG. 3 is a front view of an internal combustion engine with an intercooler in a first comparative example.

FIG. 3 is a front view of an internal combustion engine with an intercooler in a first comparative example. The internal combustion engine 101 with the intercooler in the first comparative example includes a liquid-cooled intercooler 111, an intake manifold 112, an intake air passage member 113, and a cylinder block 114. The internal combustion engine 101 with the intercooler also includes a first cylinder CY1, a second cylinder CY2, a third cylinder CY3, and a fourth cylinder CY4. In the internal combustion engine 101 in the first comparative example, as arrangement of part of the elements is different from that of the present embodiment, the reference signs are different. However, functions of the respective elements are the same as those of the present embodiment.

As shown in FIG. 3, in a general internal combustion engine, as in the internal combustion engine 101 in the first comparative example, the liquid-cooled intercooler 111 is arranged in such a manner that a cylinder bank direction center line C101 substantially matches a widthwise center line C102 of the liquid-cooled intercooler. In such a way, an intake allocation is not remarkably different between the cylinders.

In such an internal combustion engine 101 with the intercooler in the first comparative example, there is a case where an auxiliary machine such as an alternator 121 is intended to be arranged closer to the cylinder bank direction center line C101. However, when arranging in such a way, a contact portion D is generated between the liquid-cooled intercooler 111 and the alternator 121. Therefore, a need of arranging and displacing the liquid-cooled intercooler 111 arises.

Figure 4:
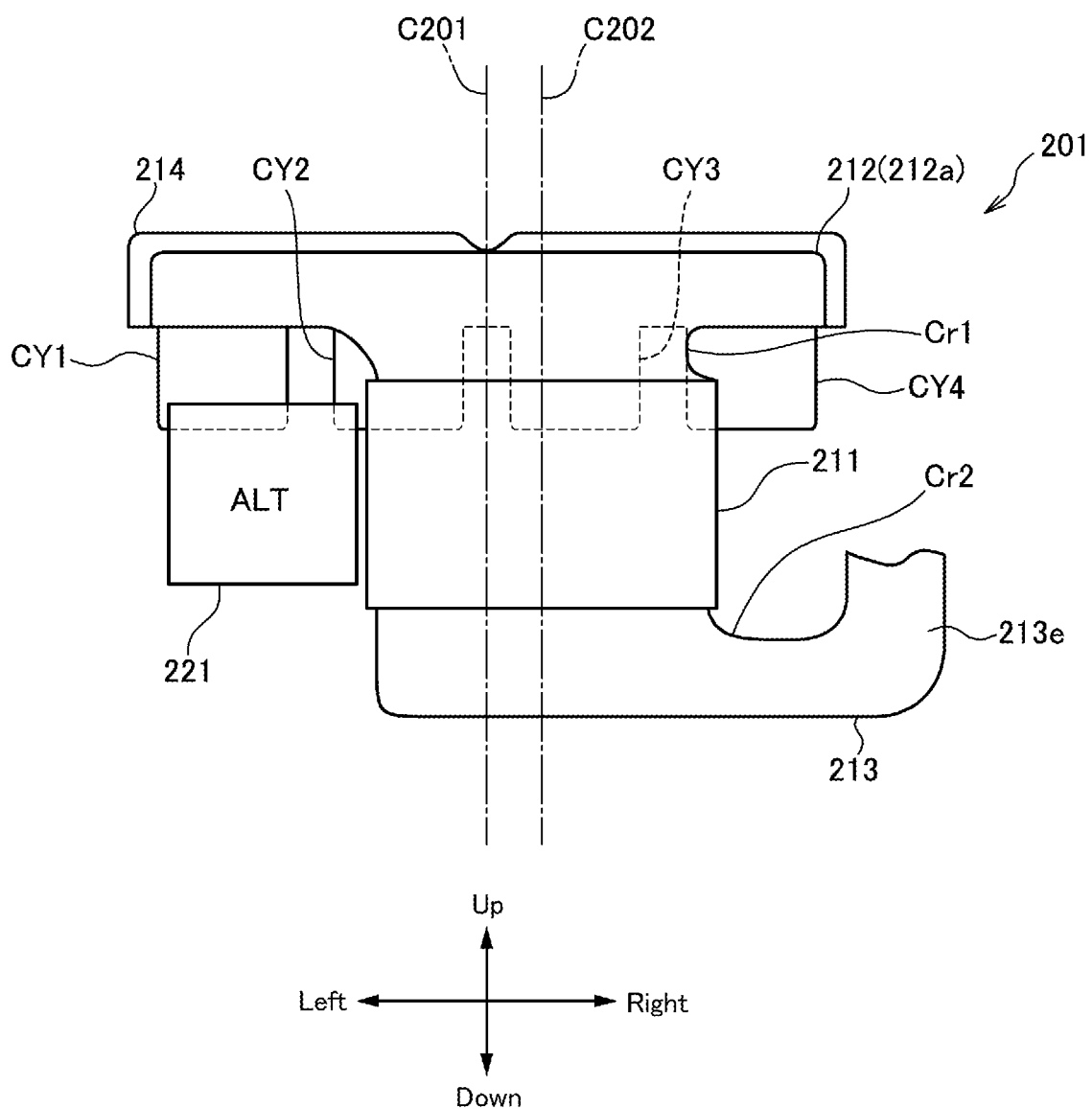
FIG. 4 is a front view of an internal combustion engine with an intercooler in a second comparative example.

FIG. 4 is a front view of an internal combustion engine with an intercooler in a second comparative example. The internal combustion engine 201 with the intercooler in the second comparative example includes a liquid-cooled intercooler 211, an intake manifold 212, an intake air passage member 213, and a cylinder block 214. The internal combustion engine 201 with the intercooler also includes a first cylinder CY1, a second cylinder CY2, a third cylinder CY3, and a fourth cylinder CY4. In the internal combustion engine 201 in the first comparative example, as arrangement of part of the elements is different from that of the present embodiment, the reference signs are different. However, functions of the respective elements are the same as those of the present embodiment.

In the above internal combustion engine 101 with the intercooler in the first comparative example, the alternator 121 cannot be arranged at a desired position due to contact with the liquid-cooled intercooler 111. In the internal combustion engine 201 with the intercooler in the second comparative example, in order to avoid contact with an alternator 221, the liquid-cooled intercooler 211 is arranged in such a manner that a widthwise center line C202 of the liquid-cooled intercooler 211 is offset to the side of the fourth cylinder CY4 (the right side in FIG. 4) from the cylinder bank direction center line C201.

When the liquid-cooled intercooler 211 is simply moved in parallel to the right side as described above, because of connection with a manifold portion 212a, a sharp curve portion Cr1 is generated in a connection portion between the liquid-cooled intercooler 211 and the manifold portion 212a. In the intake air passage member 213, there is a limitation that a position of a standing portion 213e thereof cannot be moved. Therefore, when the liquid-cooled intercooler 211 is simply moved in parallel to the right side as described above, a sharper curve portion Cr2 than the first comparative example is generated around a connection portion between the liquid-cooled intercooler 211 and the intake air passage member 213.

In such a way, when the sharp curve portions Cr1, Cr2 are generated in the connection portions on the side of the fourth cylinder CY4, the air flowing in from the intake air passage member 213 does not easily flow into the fourth cylinder CY4 due to an influence of inertia thereof. Since an amount of the air flowing into the fourth cylinder CY4 is remarkably reduced, the allocation of the inflow air is remarkably different between the cylinders.

Meanwhile, with the internal combustion engine 1 in the present embodiment, no sharp curve portion is generated. Thus, the amount of the air flowing into the fourth cylinder CY4 is not remarkably reduced unlike the second comparative example. By doing so, in the present embodiment, the allocation of the Inflow air can be not remarkably different between the cylinders.

Further, since the internal combustion engine 1 in the present embodiment has the configuration as described above, the up-down length of the entire intake system piping structure of the internal combustion engine 1 can be shortened. Then, a compact internal combustion engine 1 can be provided. Thereby, there is an advantage that other auxiliary machine can be arranged or a working space can be provided on the lower side of the intake air passage member 13 for example.

In the description of the above embodiment, the first cylinder CY1 corresponds to the end-side first cylinder and the fourth cylinder CY4 corresponds to the end-side fourth cylinder. However, the fourth cylinder CY4 may correspond to the end-side first cylinder and the first cylinder CY1 may correspond to the end-side fourth cylinder.

In this case, the liquid-cooled intercooler 11 is arranged in such a manner that the widthwise center C2b of the liquid-cooled intercooler 11 at the outlet of the liquid-cooled intercooler 11 is offset to the side of the first cylinder CY1 from the cylinder bank direction center line C1. The liquid-cooled intercooler 11 is arranged to be inclined in such a manner that the widthwise center C2a of the liquid-cooled intercooler 11 on the side of the inlet of the liquid-cooled intercooler 11 is placed closer to the side of the first cylinder CY1 than the widthwise center C2b of the liquid-cooled intercooler 11 on the side of the outlet of the liquid-cooled intercooler 11. The intake air passage member 13 is connected to the connection portion 11f of the liquid-cooled intercooler 11 from the side of the first cylinder CY1.

By doing so, a sharp curve portion is not generated in the flow passage of the air flowing into the first cylinder CY1. Thus, the allocation of the inflow air can be not remarkably different between the cylinders from the first cylinder CY1 to the fourth cylinder CY4.

In the above embodiment, the inline four internal combustion engine is described as an example. However, as a matter of course, the number of cylinders may be more than this or less than this. Even in this case, the cylinders in both end portions of these cylinders correspond to the end-side first cylinder and the end-side second cylinder.

In the above embodiment, the inline cylinder arrangement internal combustion engine is described as an example. However, not only in a case of the inline cylinder arrangement but also in a V cylinder arrangement internal combustion engine, the above embodiment can similarly be applied to one of two cylinder banks. For example, three cylinders are placed in line in a V-6 internal combustion engine, the cylinders in both end portions of the three cylinders correspond to the end-side first cylinder and the end-side second cylinder.

In the above embodiment, the liquid-cooled intercooler 11 is described as an example. However, the intercooler may be not the liquid-cooled intercooler but an air-cooled intercooler.

The embodiment of the present invention is described above. However, the above embodiment only shows part of application examples of the present invention and does not intend to limit the technical scope of the present invention to the specific configuration of the above embodiment.

The invention claimed is:

1. An intake system piping structure of an internal combustion engine, comprising:
    an intake manifold connected to an end-side first cylinder and an end-side second cylinder of the internal combustion engine which are provided farthest from each other in a cylinder bank in which a plurality of cylinders is placed in line; and
    an intercooler of which an upper end is connected to a lower end of the intake manifold, wherein
    the intake manifold and the intercooler are arranged in front of the internal combustion engine to stand upward above an intake air passage member, connected to a lower end of the intercooler, substantially in a direction of a cylinder bank direction center line in center between an axial center line of the end-side first cylinder and an axial center line of the end-side second cylinder,
    a widthwise center of the intercooler on a side of an intake inlet and a widthwise center of the intercooler on a side of the manifold are offset to a side of the end-side second cylinder from the cylinder bank direction center line, and
    the intercooler is arranged in such a manner that
        an offset amount of the widthwise center of the intercooler on the side of the intake inlet from the cylinder bank direction center line is greater than an offset amount of the widthwise center of the intercooler on the side of the manifold from the cylinder bank direction center line.

2. The intake system piping structure of the internal combustion engine according to claim 1,
    wherein the intake air passage member is connected from the side of the end-side second cylinder to the side of the intake inlet of the intercooler,
    wherein a bottom portion of the intake air passage member is parallel to an orthogonal line orthogonal to the axial center line of the end-side first cylinder and the axial center line of the end-side second cylinder.

3. The intake system piping structure of the internal combustion engine according to claim 2, wherein
    in the intake air passage member, as more distant from the side of the end-side second cylinder and closer to the side of the end-side first cylinder, a distance from a connection portion between the intake air passage member and the intercooler to the bottom portion of the intake air passage member becomes shorter.

4. The intake system piping structure of the internal combustion engine according to claim 3, wherein
    the lower end of the intercooler on the side of the end-side second cylinder matches an upper end of the intake air passage member, and
    the lower end of the intercooler on the side of the end-side first cylinder is arranged on a lower side of the upper end of the intake air passage member.

5. The intake system piping structure of the internal combustion engine according to claim 1, wherein
    the intake manifold has a manifold portion and a branch portion, and
    the upper end of the intercooler on the side of the end-side second cylinder matches a lower surface of the manifold portion, and
    the upper end of the intercooler on the side of the end-side first cylinder is arranged on a lower side of the lower surface of the manifold portion.

6. The intake system piping structure of the internal combustion engine according to claim 1, wherein the cylinder bank direction center line is parallel to the axial center line of the end-side first cylinder and the axial center line of the end-side second cylinder.

* * * * *